No. 625,981. Patented May 30, 1899.
J. MUSSELL.
MOWING MACHINE ATTACHMENT.
(Application filed July 13, 1898.)
(No Model.) 2 Sheets—Sheet 1.
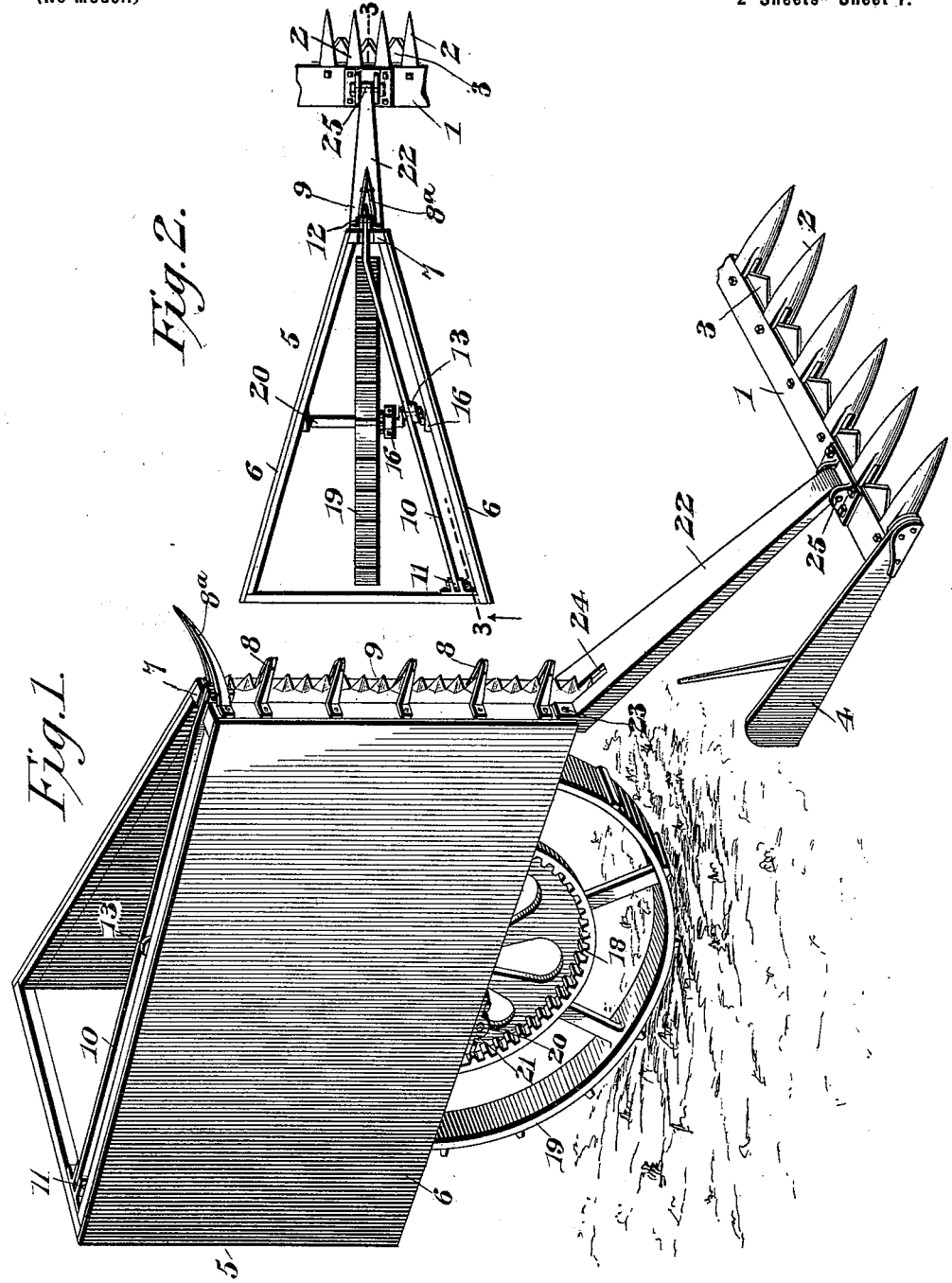
Witnesses
Jas. K. McCathran
S. P. Hochhaupter
Jacob Mussell Inventor
By his Attorneys.
C. A. Snow & Co.

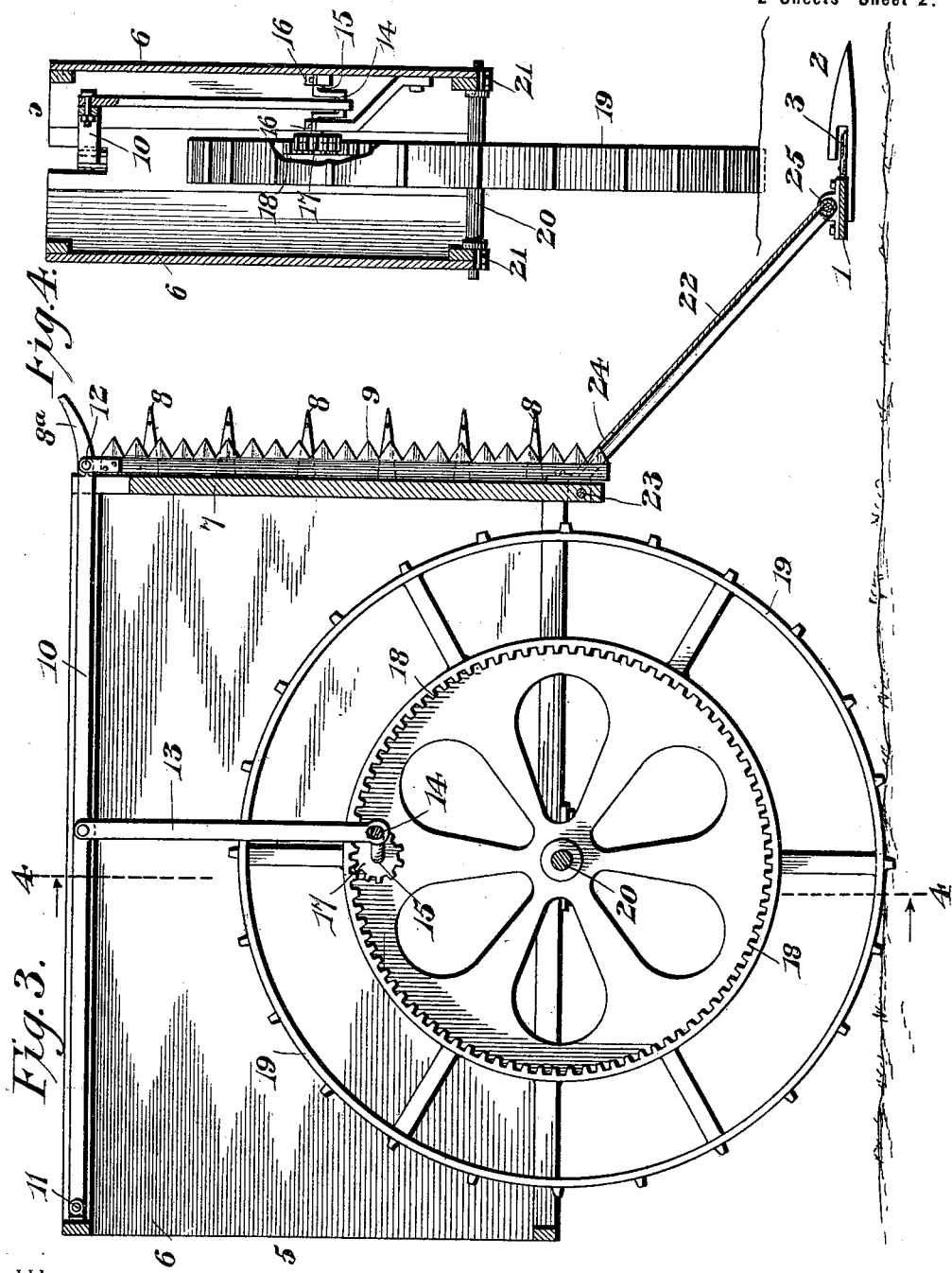

UNITED STATES PATENT OFFICE.

JACOB MUSSELL, OF SUCKER, OREGON.

MOWING-MACHINE ATTACHMENT.

SPECIFICATION forming part of Letters Patent No. 625,981, dated May 30, 1899.

Application filed July 13, 1898. Serial No. 685,858. (No model.)

*To all whom it may concern:*

Be it known that I, JACOB MUSSELL, a citizen of the United States, residing at Sucker, in the county of Malheur and State of Oregon, have invented a new and useful Mowing-Machine Attachment, of which the following is a specification.

This invention relates to mowing-machine attachments; and it has for its object to provide, in connection with the usual horizontal cutting apparatus of a mowing-machine, a supplemental vertically-disposed cutting mechanism arranged in such a relation to the outer end of the main cutting apparatus as to act in the capacity of a track-clearer to cut the swaths apart and divide the same.

To this end the invention contemplates an improved form of track-clearing attachment for mowing-machines that shall better perform the functions of the usual swath-board, especially in alfalfa hay.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of the cutting apparatus of an ordinary mowing-machine, showing the applied position of the track-clearer attachment. Fig. 2 is a top plan view of the attachment and the adjacent end portion of the horizontal finger-bar of the main cutting apparatus. Fig. 3 is a vertical longitudinal sectional view of the attachment on the line 3 3 of Fig. 2. Fig. 4 is a vertical cross-sectional view on the line 4 4 of Fig. 3.

Referring to the accompanying drawings, the numeral 1 designates the horizontal finger-bar of the cutting apparatus of an ordinary mowing-machine, said finger-bar carrying at the front edge thereof the usual guard-fingers 2, within which works the reciprocating cutter-bar or sickle 3, which is given its movement in the usual way and is operated entirely independent of the clearer attachment contemplated by the present invention, and since the cutting apparatus referred to is of any ordinary construction the body of the mowing-machine and its connections with the cutter-bar or sickle are not illustrated in the drawings.

The finger-bar 1 of the main cutting apparatus of the mowing-machine has fitted to the outer end thereof the usual end shoe 4, which serves to divide the grass or hay, so as to separate that which is cut from that which is left standing; but the attachment forming the subject-matter of the present invention is designed for use in connection with any type of mowing-machine having a horizontal cutting apparatus, and the working parts of this attachment are carried by a traveling triangular cutter-shoe 5. The traveling triangular cutter-shoe 5 is adapted to be arranged in rear of the horizontal finger-bar 1, near the outer end thereof, and essentially comprises a skeleton triangular framework carrying at opposite sides thereof the opposite vertically-disposed forwardly-convergent side pieces 6, which are connected at their contiguous front ends by a vertical cutter-supporting strip or base 7.

By reason of the triangular shape of the cutter-shoe 5 the forwardly-convergent vertical side pieces 6 thereof provide for properly dividing and spreading apart the swaths, so as to make a clear track, and thereby relieve the mowing-machine from the usual strong side draft which is occasioned when a proper separation is not effected between the cut and uncut grass or hay. The front strip or base 7, which connects the contiguous front ends of the side pieces 6, forms a support for the vertically-disposed cutting mechanism of the attachment, and on the outer side of this supporting strip or base 7 is suitably fastened a vertical series of guard-fingers 8, within which is mounted to reciprocate the vertically-moving cutter-bar or sickle 9, which coöperates with the guard-fingers 8 to provide for cutting the material in the same manner as the guard-fingers and sickle of the main cutting apparatus. The uppermost guard-finger, (designated by $8^a$,) arranged at the upper end of the supporting strip or base 7, is elongated and of a segmental shape. This upper guard-finger $8^a$ curves outwardly and upwardly from the supporting strip or base and not only serves the usual function of a guard-finger, but also as a guide for throwing all alfalfa or loose grass down into the sickle or cutting apparatus.

Motion is communicated to the vertically-disposed and reciprocating cutter-bar or sickle 9 through the medium of a swinging operating-lever 10, arranged within the upper part of the shoe-frame 5 and pivotally supported at one end, as at 11, to a fixed point of attachment on said frame, the other or opposite end of said lever 10 being pivotally connected at 12 with the upper end of the cutter-bar or sickle 9. The operating-lever 10 for the cutter-bar or sickle swings in a vertical plane and is given its movement from an upright pitman 13, arranged within the shoe 5 and pivotally connected at its upper end with the lever 10 at a point intermediate the ends of the latter, the lower end of said pitman loosely engaging the crank 14 of a short horizontally-disposed crank-shaft 15. The said short horizontally-disposed crank-shaft 15 is journaled in fixed alined bearings 16, fitted to the framework of the shoe, within the same, and one end of said shaft has mounted thereon a pinion 17, meshing with the cogs of an internally-toothed gear or gear-ring 18, carried at one side of a ground drive-wheel 19. This ground drive-wheel 19 is mounted on an axle 20, whose extremities are loosely journaled, as at 21, in the opposite side pieces 6 of the shoe, near the lower edges of the latter, thereby positioning the said wheel 19 so that the lower portion thereof projects below the shoe and forms a rolling or traveling support therefor, said shoe being necessarily elevated above the ground and the plane of the main horizontal cutting apparatus of the mowing-machine.

To provide for the travel of the cutter-shoe and its attachments with the mowing-machine and its connection with the latter, there is employed a draft-bar 22. The draft-bar 22 is rigidly connected at its rear end at 23 to the shoe 5, at the front lower end thereof, and at its point of connection with the shoe 5 the said draft-bar 22 is provided with a longitudinally-disposed slot 24 to accommodate the movement of the lower end of the cutter-bar or sickle 9. From its connection with the cutter-shoe 5 the bar 22 is extended downwardly and forwardly and has its front end connected by a pivotal or hinge joint 25 with the upper side of the main finger-bar 1, near the extreme outer end thereof, and this pivotal or hinge connection between the bar 22 and the finger-bar 1 permits the cutter-shoe 5 to freely adjust itself to inequalities of the ground over which the machine travels, and it will be understood that while the mowing-machine is in motion the wheel 19, through the medium of the connections described, will provide for the continuous automatic reciprocation of the cutter-bar or sickle 9.

Changes in the form, proportion, and the minor details of construction may be resorted to without departing from the principle or sacrificing any of the advantages of this invention.

Having thus described the invention, what is claimed as new, and desired to be secured by Letters Patent, is—

1. In a mowing-machine attachment, a cutter-shoe supported for travel upon the ground in rear of and connected with a finger-bar of a mowing-machine, vertically-disposed cutting mechanism fitted to said shoe, and actuating means, carried by the shoe, for said cutting mechanism, substantially as set forth.

2. In a mowing-machine attachment, a cutter-shoe supported for travel upon the ground in rear of the finger-bar of a mowing-machine, a draft-bar connecting said shoe with the finger-bar, vertically-disposed cutting mechanism fitted to the shoe, and means for actuating said mechanism, substantially as set forth.

3. In a mowing-machine attachment, a traveling cutter-shoe having at the front end thereof vertically-disposed cutting mechanism, a draft-bar having a rigid connection at one end with the front lower end portion of the shoe and adapted to be pivoted or hinged at its other end to the horizontal finger-bar of a mowing-machine, and means for actuating said cutting mechanism, substantially as set forth.

4. In a mowing-machine attachment, a V-shaped shoe supported for travel upon the ground in rear of the horizontal cutting apparatus of a mowing-machine, and having vertical forwardly-convergent side pieces, vertically-disposed cutting mechanism fitted to the front end of the shoe, and actuating means, carried by the shoe, for said cutting mechanism, substantially as set forth.

5. In a mowing-machine attachment, a V-shaped cutter-shoe supported for travel upon the ground in rear of the horizontal cutting apparatus of a mowing-machine, said shoe being capable of vertical movement independently of said cutting apparatus of the mowing-machine, vertically-disposed cutting mechanism fitted to the front end of said shoe, and means for actuating said mechanism, substantially as set forth.

6. In a mowing-machine attachment, a traveling cutter-shoe arranged in rear of the horizontal cutting apparatus of a mowing-machine, vertically-disposed cutting mechanism fitted to the front end of said shoe, a ground-wheel arranged within the shoe and supporting the latter, and operating connections between said wheel and the cutting mechanism, substantially as set forth.

7. In a mowing-machine attachment, a traveling cutter-shoe arranged in rear of the horizontal cutting apparatus of a mowing-machine, a vertically-reciprocating cutter or sickle mounted on the front end of the shoe, a ground-wheel arranged within the shoe and provided at one side with a gear or gear-ring, a crank-shaft journaled within the shoe and carrying at one end a pinion meshing with said gear or gear-ring, an operating-lever pivotally supported within the shoe and connected at one end with said reciprocating cutter or sickle, and a pitman connection between
5 said crank-shaft and said lever, substantially as set forth.

In testimony that I claim the foregoing as my own I have hereto affixed my signature in the presence of two witnesses.

JACOB MUSSELL.

Witnesses:
   GEORGE E. SKINNER,
   L. B. LEES.